(12) United States Patent
Conway (10) Patent No.: US 7,768,919 B1
(45) Date of Patent: Aug. 3, 2010

(54) SELECTIVE PACKET DISCARD APPARATUS AND METHOD

(75) Inventor: Adrian E. Conway, Weston, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1229 days.

(21) Appl. No.: 10/424,521

(22) Filed: Apr. 28, 2003

(51) Int. Cl.
 *H04J 3/14* (2006.01)
(52) U.S. Cl. ............................ 370/232; 370/252
(58) Field of Classification Search ............ 370/229, 370/234, 252, 394
 See application file for complete search history.

(56) References Cited

U.S. PATENT DOCUMENTS

| | | | |
|---|---|---|---|
| 5,444,706 A | | 8/1995 | Osaki |
| 5,629,936 A | * | 5/1997 | Lee et al. ............ 370/230 |
| 6,219,339 B1 | | 4/2001 | Doshi et al. ............ 370/235 |
| 7,158,518 B2 | * | 1/2007 | Burmeister et al. ...... 370/392 |
| 7,180,896 B1 | * | 2/2007 | Okumura ............ 370/394 |
| 2007/0201365 A1 | * | 8/2007 | Skoog et al. ............ 370/230.1 |

OTHER PUBLICATIONS

ITU-T Y.1541 Network Performance Objectives for IP-Based Services (Draft Oct. 2001).*

Chao, H. Jonathan and Cheng, Hsiling, "A New QOS-Guaranteed Cell Discarding Strategy: Self-Calibrating Pushout," Proc. IEEE Globecom '94, 929-934, San Francisco, CA (1994).

Conway, Adrian E. and Rosenberg, Catherine, "A Simple Balanced Fair Blocking Mechanism for Discrete-Time Multiplexing of Bursty Traffic Sources," Proc. IEEE ICCCN 1999, 36-41, Boston MA (Oct. 1999).

Conway, Adrian E. and Rosenberg, Catherine, "Weighted Fair Blocking Mechanisms for Discrete-Time Multiplexing," Proc. IEEE Infocom '96, 1045-1053, San Francisco, CA (1996).

Kröner, Hans et al., "Priority Management in ATM Switching Nodes," IEEE Journal on Selected Areas in Communications, 9(3): 418-427 (Apr. 1991).

Yang, Tao and Pan, Jie, "A Measurement-Based Loss Scheduling Scheme," Proc. IEEE Infocom '96, 1062-1071, San Francisco, CA (1996).

* cited by examiner

*Primary Examiner*—Seema S Rao
*Assistant Examiner*—Henry Baron (57) ABSTRACT

A selective packet discard mechanism is disclosed for selectively discarding packets at buffers in packet switches in the event of traffic congestion. The mechanism makes use of ordering information contained in data packets, such as forward sequence numbers or timestamps, to estimate the packet loss that traffic flows may have already incurred at upstream packet-switching nodes. This estimated upstream packet loss information is used to make improved packet discard decisions. The mechanism may be applied independently to a plurality of buffers at a plurality of packet switches to form a distributed data traffic management system.

58 Claims, 7 Drawing Sheets

$D(f,t)$ = NUMBER OF PACKET DISCARDS FROM FLOW f UP TO AND INCLUDING TIME t $A_{buf}(t)$ = SET OF FLOWS THAT HAVE AT LEAST ONE PACKET IN BUFFER AT TIME t

SELECTIVE PACKET DISCARD APPARATUS AND METHOD

BACKGROUND OF THE INVENTION

1. Field of Art

The present invention relates to packet exchange networks and, more specifically, to apparatuses and methods for selectively discarding data packets in packet exchange networks in order to meet quality of service performance requirements for multiple data traffic streams having a diverse range of data and transmission characteristics.

2. Related Art

In integrated packet exchange networks, it is often desirable or necessary to manage network resources to meet different quality-of-service (QoS) requirements for multiple traffic streams and flows. In practice, this constitutes a major challenge for network operators because different traffic streams may have vastly different data characteristics and QoS requirements. In an effort to realize optimum QoS performance for multiple and diverse traffic streams, various data traffic management mechanisms have been proposed, most of which attempt to minimize data packet losses and delays as data packets travel from source nodes to destination nodes in the packet exchange network. Usually, although not necessarily, these mechanisms employ some form of priority-based or measurement-based service or loss scheduling.

Service and loss scheduling are typically applied to packet buffer pools waiting to use a limited network resource. Such packet buffer pools may be found, for example, at queues, inputs and outputs to packet switches or packet switch processors, and at queues, inputs and outputs to communications channels for packet switches. Packet buffer pools may also be found in network switches, routers, multiplexers, or any other node or device in a packet exchange network having data packet buffers configured to receive and store data packets from multiple distinguishable data streams and flows. As a result of network traffic congestion, a buffer pool or communication channel may become fully occupied, in which case it becomes necessary to selectively schedule data packet transmissions or selectively discard packets when there are new packet arrivals.

Two types of priority-based traffic management mechanisms are time-priority and space-priority. Time priority mechanisms are typically implemented by employing some form of selective service scheduling for each communication channel in the packet exchange network. That is, whenever a communications channel completes transmitting a packet (also called a "cell" in asynchronous transfer mode networks), a priority rule is applied to determine which packet should be transmitted next. Fair queuing (FQ) is a well-known example of a service-scheduling mechanism that could be employed in an effort to achieve a higher end-to-end QoS performance in networks where, in the interest of fairness, the goal is to give multiple traffic streams substantially equal access to limited network resources. Another approach is to use weighted fair queuing (WFQ), where the goal is to give multiple traffic streams access to limited network resources in proportion to an assigned weight.

Space-priority mechanisms, on the other hand, are typically implemented by employing some form of selective loss scheduling, which discards selected data packets based on priority. Various selective packet discard mechanisms have been proposed to discard packets intelligently in an effort towards achieving the goal of meeting the end-to-end loss requirements of individual traffic flows or providing fairness among traffic flows in accessing limited network resources.

Hitherto proposed selective discard mechanisms include, for example: the push-out scheme presented in H. J. Chao & H. Cheng, *A New QoS-Guaranteed Cell Discarding Strategy: Self-Calibrating Pushout*, in Proc. IEEE Globecom '94, pp. 929-934, San Francisco, Calif. 1994; the partial buffer sharing (PBS) scheme presented in H. Kroner, G. Hebuterne, P. Boyer & A. Gravey, *Priority Management in ATM Switching Nodes*, IEEE Journal on Selected Areas of Communications, Vol. 9, No. 3, pp. 418-427, April 1991; the weighted fair blocking (WFB) schemes presented in A. E. Conway & C. Rosenburg, *Weighted Fair Blocking Mechanisms for Discrete-Time Multiplexing*, in Proc. IEEE Infocom '96, pp. 1045-1053, San Francisco, Calif. 1996 and A. E. Conway & C. Rosenburg, *A Simple Balanced Fair Blocking Mechanism for Discrete Time Multiplexing of Bursty Traffic Sources*; in Proc. IEEE ICCCN '1999, pp. 36-41, Boston, Mass. October 1999; and the packet discard scheme disclosed in U.S. Pat. No. 5,444,706, entitled "Packet Exchange Network and Method of Controlling Discard of Packets in Packet Exchange Network." Each of these references is incorporated herein by reference in its entirety.

Measurement-based loss scheduling schemes involve the on-line measurement and maintenance of packet loss ratios for each traffic stream. When a data packet (or cell) arrives at a packet buffer that is already full, measurement-based loss scheduling schemes identify and discard a packet that belongs to the traffic stream with the smallest ratio between its loss ratio measurement and the traffic stream's specified maximum loss requirement. One such measurement-based loss-scheduling scheme is presented by T. Yang & J. Pan, *A Measurement-Based Loss Scheduling Scheme*, Proc. IEEE Infocom '96, pp. 1062-1071, San Francisco, 1996, the entirety of which is also incorporated herein by reference.

A common disadvantage of conventional selective packet discard mechanisms is that the decision regarding the choice of packets to be discarded in the event of packet buffer congestion is based solely on information that is available at the packet switching node making the discard decision. Such local information may include, for example, the QoS requirement of each traffic flow, the number of received packets in each traffic flow, and the number of packets in each traffic flow that have been discarded at the local packet switch. Such local information does not include the packet loss that a traffic flow may have already incurred at other upstream packet-switching nodes. Consequently, the local packet discard decisions being made at a packet switch using a conventional selective packet discard mechanism usually do not provide the desired end-to-end packet loss performance or the desired QoS fairness among traffic flows.

In the interest of addressing these and other problems associated with conventional selective discard mechanisms, the industry needs a more intelligent system for selectively discarding data packets, which takes into consideration the upstream packet loss already incurred by the data flow at the time the discard decision is made. Such a system would be even more useful if it were adapted to use, in addition to upstream packet loss, the current state of the local packet switching node, as well as a specified discard policy.

SUMMARY OF INVENTION

The present invention addresses these needs by providing a selective packet discard mechanism that calculates and uses an estimated packet loss that traffic flows have already incurred at upstream packet buffers. The devices, systems and methods of the present invention take advantage of the fact that packets in the traffic flows traversing the packet buffer pools normally contain information suggesting a particular ordering of packets in the traffic flow, such as packet forward sequence numbers or time stamps. This would be the case, for example, in voice-over-packet traffic flows that use real time-transport protocol (RTP) packets. By examining the forward sequence numbers or time stamps of the data packets in the traffic flows, the invention can calculate an estimated packet loss that has already occurred upstream in each packet flow. The upstream packet loss estimate is then used to decide locally which packets should be selected for discard when there is buffer pool congestion. Since the packet discard decision takes into account the packet loss that has already occurred in each traffic flow at the upstream nodes, the selective discard mechanism of the present invention is better able to realize desired end-to-end loss performance and better able to achieve end-to-end fairness to all traffic flows, in terms of packet losses, due to network link or buffer pool congestion. The improved selective packet discard mechanism of the present invention is a form of measurement-based loss scheduling. In essence, it augments conventional measurement-based loss scheduling schemes by providing additional information that is made available by ordering information, such as forward sequence numbers or time stamps.

It is theoretically possible to configure a conventional packet discard mechanism to store information about the number of lost or discarded packets for each traffic flow in a centralized database, and communicate that information to all the nodes in the packet exchange network, on a regular or "as needed" basis, so that discard decisions being made at local packet buffers can take into account the upstream packet loss that a particular traffic flow may have already experienced. The practical reality of this approach, however, is that the necessity of continually communicating and updating packet loss information for every packet buffer in every packet switch for the entire packet exchange network adds a tremendous amount of processing overhead and complexity to the job of managing network data traffic. The present invention avoids these processing and complexity issues.

In accordance with the present invention, there is provided a packet switch, comprising an inbound transmission channel, a packet buffer configured to receive an arriving data packet for a data flow from the inbound transmission channel, and a processor configured to make a determination, based on an estimated upstream packet loss for the data flow, whether the arriving data packet or a data packet previously stored in the packet buffer should be discarded. For purposes of the present invention, an "inbound transmission channel" may comprise a wired or wireless data communications link between the packet buffer and an upstream packet switching device or node, or an internal data communications channel (such as a communications bus) between the packet buffer and other internal components in the packet switch. In a preferred embodiment, the estimated upstream packet loss may be determined using any information stored in the arriving data packet which suggests its order in the data flow relative to other data packets in the data flow, such as the data packet's sequence number or time-stamp.

Using this relative ordering information for an arriving data packet, certain assumptions can be made about the number of packets that have been lost upstream. In other words, the relative ordering information contained in each arriving data packet makes it possible to calculate an estimate of the number of packets in the data flow that were lost upstream. An estimated upstream packet loss ratio for the data flow may be computed by first calculating the total number of data packets in the data flow that have been lost or discarded, and dividing the result by the total number of data packets in the data flow. The total number of data packets in the data flow includes the number of packets lost upstream, the number of packets discarded at the local packet buffer, and the number of packets successfully received.

In addition to determining whether the arriving data packet or a data packet already stored in the packet buffer should be discarded, the processor of the present invention—which may comprise a computer, a computer program, a microprocessor, or some combination of each—may be further configured to remove the arriving data packet from the inbound transmission channel, to delete the data packet previously stored from the packet buffer, or both. The processor may also be configured to discard the data packet previously stored in the packet buffer, and insert the arriving data packet.

In some embodiments, the determination of which data packet to discard and which one to keep may further depend on the current state of the packet buffer. The state of the buffer may depend on a number of useful pieces of information associated with the packets already in the buffer, such as the arrival times of each data packet, or the data packet's ordering in any queue or transmission channel associated with the packet buffer. To achieve certain QoS requirements, a system incorporating the present invention may also be configured to use a specified discard policy. In some QoS networks, for example, it may be necessary or desirable to implement a policy of minimizing the maximum loss rate of all data flows traversing the packet buffer, such that no particular flow is any more or less likely to have its data packets discarded than any other flow. In other networks, it may be important to apply special treatment (priority) to some flows. This may be accomplished, for example, by using a discard policy that assigns a "weight" to each data flow traversing the buffer and applying a weighted loss rate function at the point of making the decision to discard or not discard arriving and stored data packets.

According to another aspect of the invention, there is provided a distributed data traffic management system for a packet exchange network, comprising a plurality of data communication channels, and a plurality of packet switches connected to the packet exchange network, each packet switch being operable to transmit data packets over some or all of the data communication channels. Further, each packet switch in the plurality of packet switches comprises, an inbound transmission channel, a packet buffer configured to receive from the inbound transmission channel an arriving data packet for a data flow, and a processor configured to make a determination, based on an estimated upstream packet loss for the data flow, whether to discard the arriving data packet or a data packet previously stored in the packet buffer. Like the packet switch of the first aspect of the invention, summarized above, the determination of which data packet to discard also may be further based on the current state of the buffer or a specified discard policy.

In still another aspect of the invention, a method for selectively discarding data packets in a packet exchange network having a packet switch is provided. The method comprises the steps of receiving at the inbound transmission channel an arriving data packet for a data flow g at time t and, if the packet buffer is not full, transferring the arriving data packet from the inbound transmission channel to the packet buffer. If the packet buffer is full, however, the next steps are to determine the number of data packets $D(g,t)$ in the data flow that were previously discarded from the inbound transmission channel, calculate an estimated upstream loss $L^*(g,t)$ for data flow g, calculate an estimated upstream loss $L^*(f,t)$ for all data flows f in the packet exchange network having at least one data packet stored in the packet buffer, and discard the arriving data packet or a data packet previously stored in the packet buffer, based on D(g,t), L*(g,t), and L*(f,t). As with the packet switch and distributed data traffic management system summarized above, the estimated upstream packet loss L*(g, t) for the data flow may be determined based on the sequence number or time stamp associated with the arriving data packet, and the determination of which packet to discard may further depend on the current state of the buffer and/or a specified discard policy.

Additional embodiments and features of the present invention are set forth in part in the description that follows, and in part are apparent from the description, or may be learned by practice of the invention. The embodiments and features of the invention may also be realized and attained by means of the instrumentalities and combinations particularly set out in the appended claims.

BRIEF DESCRIPTION OF THE FIGURES

The foregoing summary, as well as the following detailed description, will be best understood in conjunction with the attached drawings, which are incorporated in and constitute part of the specification. The drawings illustrate preferred embodiments of the invention, and, together with the description, serve to explain the principles of the present invention.

DETAILED DESCRIPTION OF THE PREFERRED EMBODIMENTS

Reference will now be made in detail to preferred embodiments of the invention, examples of which are illustrated in some of the drawings. Notably, the present invention may be implemented using software, hardware, or any combination thereof, as would be apparent to those of ordinary skill in the art. Therefore, the figures and examples below are not meant to limit the scope of the present invention or its embodiments or equivalents.

Figure 1:
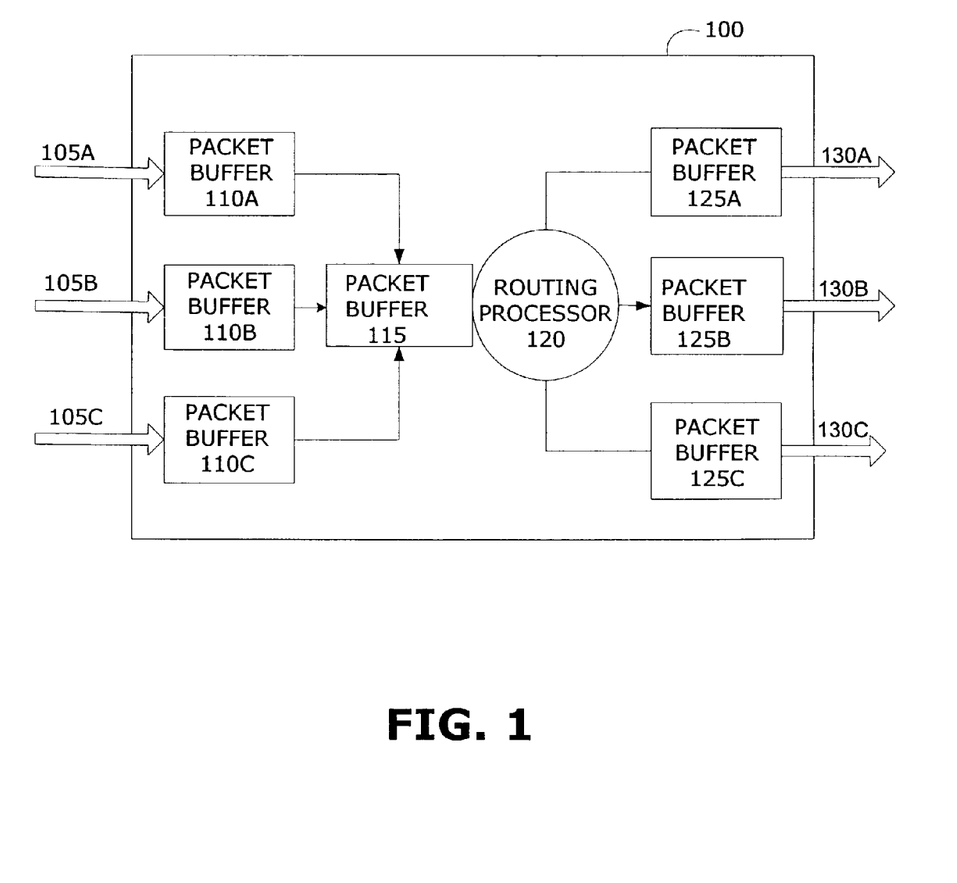
FIG. 1 shows a high-level block diagram of a packet switching device.

FIG. 1 shows a high-level block diagram of a packet switching device that could comprise a node in a packet switching network. A packet switching device (which may be referred to herein as a router) may use a combination of input buffers, output buffers, and processor buffers at a number of locations or processing points. As shown in FIG. 1, for example, packet buffers 110A, 110B and 110C are configured to temporarily hold packets that have arrived on input links 105A, 105B and 105C of packet switching device 100. In addition, packet buffers 125A, 125B and 125C are configured to temporarily hold outgoing packets before they are transmitted on outgoing links 130A, 130B and 130C. Some packet switching devices also have packet buffers at internal routing processors to temporarily hold packets before they are actually processed (e.g., routed). In FIG. 1, for example, packet buffer 115 is configured to receive data packets from packet buffers 110A, 110B and 110C and hold them until routing processor 120 is ready to operate on them. Depending on the specific architecture of a switch, a packet switching device may be implemented with or without all of the buffers illustrated in FIG. 1.

Figure 2:
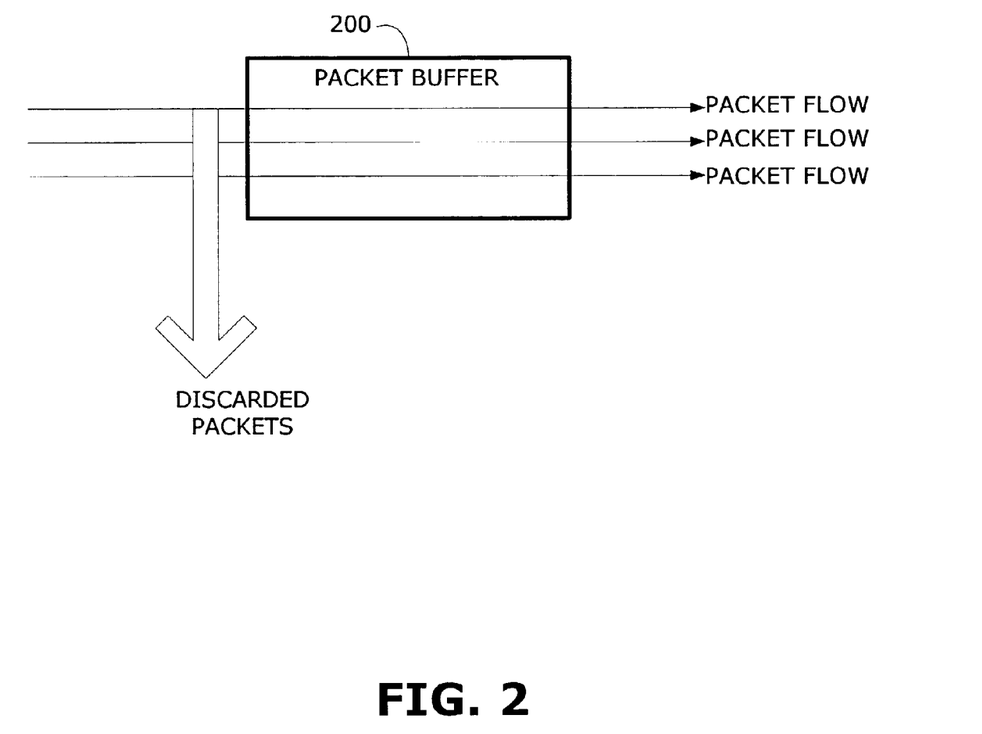
FIG. 2 shows a logical diagram illustrating the operation of a selective discard mechanism on a packet buffer, which may be included in a packet switch.

FIG. 2 shows a logical diagram illustrating the operation of a selective discard mechanism at a packet buffer in a packet switch. The packet buffer 200 may serve as a queue for packets prior to being processed or transmitted. When a new packet arrives at the packet buffer, it is placed in the buffer if the buffer is not already fully occupied. If the buffer is already fully occupied, then a discard decision must be made. One approach is to simply discard the arriving data packet. As mentioned above, however, various selective discard methods have already been developed to discard packets more intelligently in an attempt to meet the end-to-end loss requirements of individual traffic flows or to provide fairness among traffic flows in terms of QoS. Typically, this involves making a decision whether to discard the arriving packet or a packet already stored in the packet buffer based on a specified set of rules.

Figure 3:
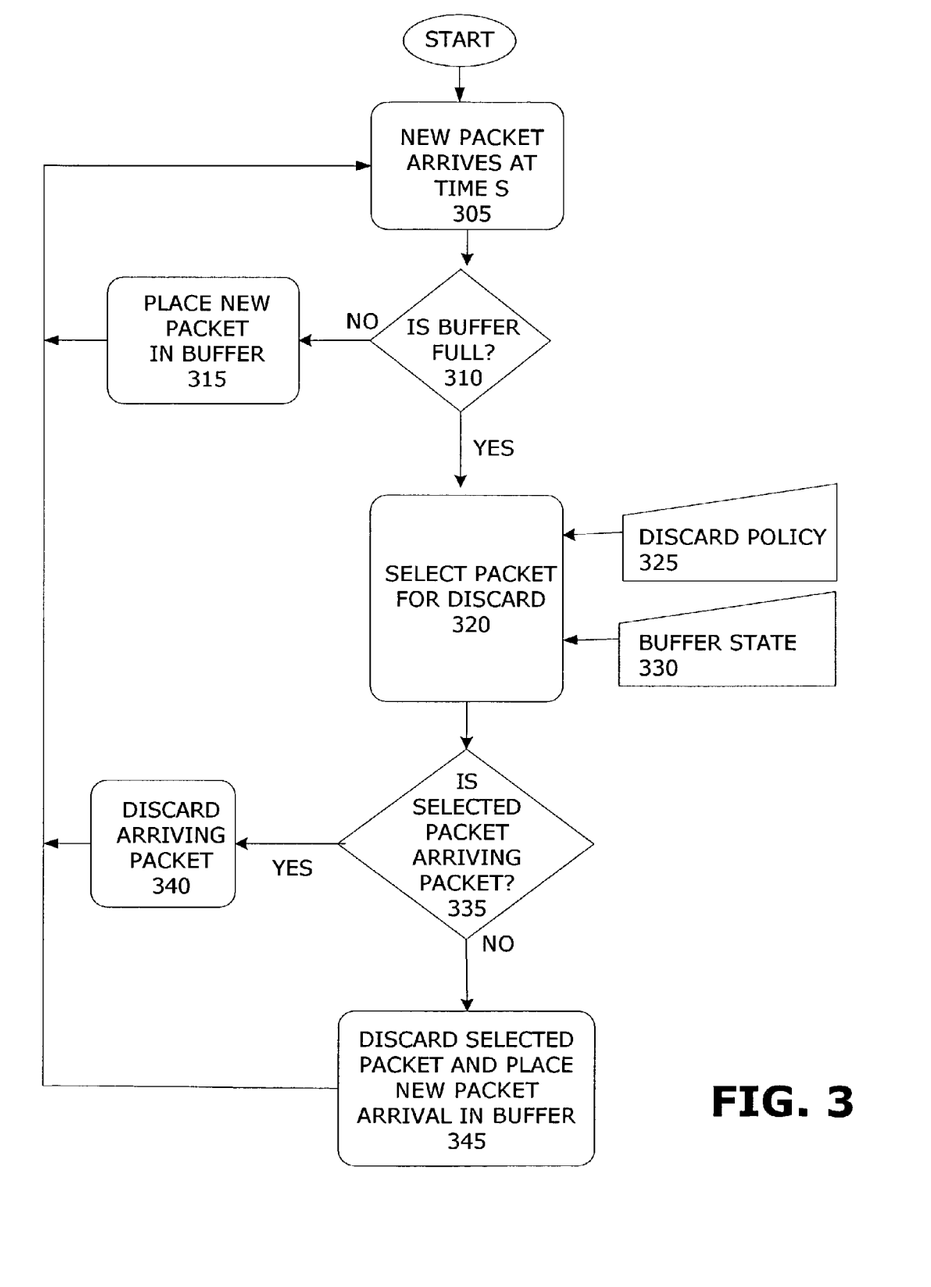
FIG. 3 depicts a flow diagram illustrating an example of an algorithm typically performed by a selective discard mechanisms.

FIG. 3 depicts a flow diagram illustrating the steps performed to selectively discard data packets in one example of a conventional selective discard mechanism. Beginning at step 305, a new packet arrives at the buffer. The system checks, at step 310, to determine whether the packet buffer is already full. If the packet buffer is not full, then the arriving data packet is placed in the packet buffer, step 315, and control passes back to step 305, where a new data packet arrives at the input queue. On the other hand, if the buffer is full, then processing continues at step 320, where a packet is selected for discard based on a specified discard policy and buffer state, which are conveyed via inputs 325 and 330 of FIG. 3. Next, at step 335, the system checks to determine whether the packet selected for discard is the arriving packet. If it is, then the arriving packet is discarded at step 340, and control passes again to step 305, where a new data packet is received at the packet buffer. If it is determined at step 335, however, that the packet selected for discard is not the arriving data packet, then the selected packet is discarded and the arriving packet is put in the queue, step 345. Control is then passed back, once again, to step 305, where the system waits for another packet to arrive.

Figure 4:
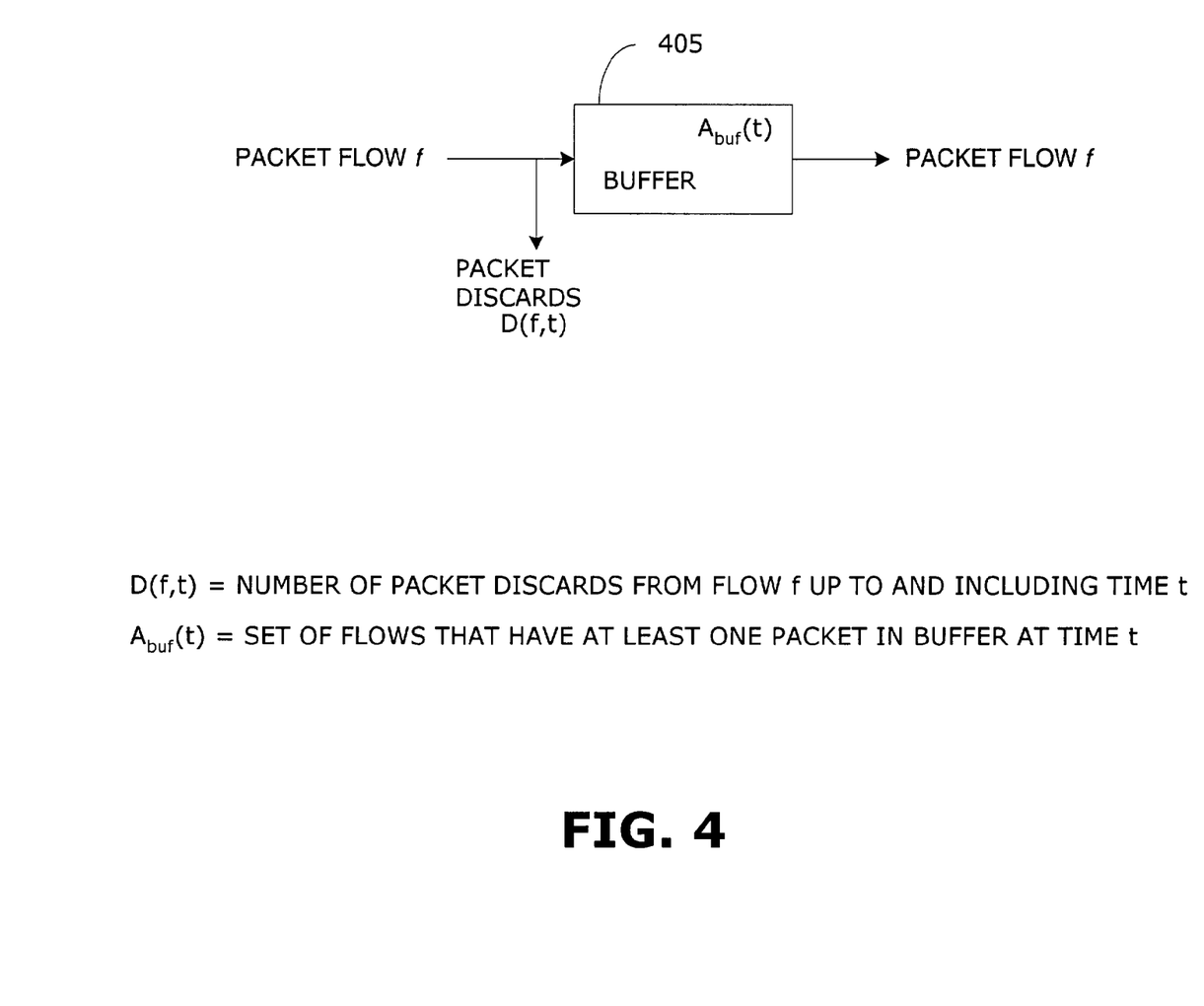
FIG. 4 shows a logical diagram illustrating the operation of the selective discard mechanism of the present invention on a packet buffer.

With reference now to FIGS. 4 through 7, the present invention is now described in more detail. For purposes of the present invention, it is helpful to identify certain variables as functions of time t and packet flow f. A packet flow is a set of packets that is transmitted from a particular identifiable source to a particular identifiable destination over a finite period of time. Thus, different packet flows may be distinguished by their individual source and destination end-points. A packet flow may be defined to be active at a buffer at time t if at least one packet associated with the source and destination flow combination has arrived at the buffer prior to time t. In FIG. 4, for example, packet flow f is considered active at Buffer 405 at time t when one packet associated with flow f has arrived at Buffer 405 prior to time t. A(t) is defined as the set of active flows that have had at least one packet traverse Buffer 405 up to time t. D(f,t) is the number of packets of flow f that have been discarded at the buffer up to time t as a result of the decisions of the selective discard mechanism.

Figure 5:
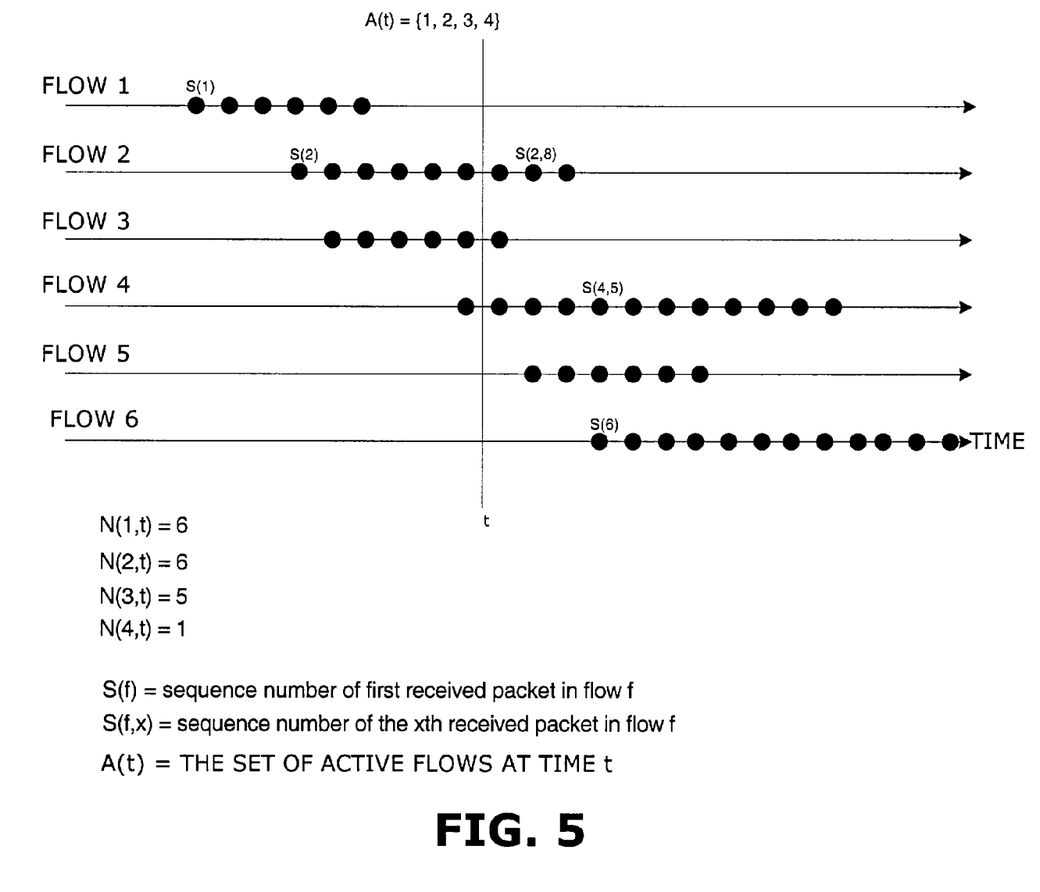
FIG. 5 depicts a logical diagram illustrating packet flows arriving at a buffer as a function of time t.

Continuing now with reference, to FIG. 5, S(f) is defined as the sequence number of the first received packet in flow f. S(f,x) is the sequence number of the $x^{th}$ received packet in flow f. N(f,t) is defined as the number of packet arrivals of flow f at the buffer up to and including time t. P(t) is the set of packets in the buffer at time t. Notably, FIG. 5 only shows data packet arrival times. It does not show when the data packets leave. Thus, at time t, and as shown in FIG. 5, the set A(t) comprises four elements, flows 1, 2, 3, and 4. Moreover, at time t, N(1,t)=6, N(2,t)=6, N(3,t)=5 and N(4,t)=1.

With the above-defined variables in mind, an estimate of the upstream packet loss ratio L(f,t) for flow f at time t is then given by the equation:

$$L(f,t)=(S(f,N(f,t))-S(f)+1-N(f,t))/(S(f,N(f,t))-S(f)+1),$$

where S(f, N(f,t))−S(f)+1−N(f,t) is an estimate of the number of packets of flow f that have been lost upstream up to time t.

An estimate of the upstream packet loss ratio L*(f,t) for flow f at time t, including any packets previously discarded at the buffer, is given by:

$$L^*(f,t)=(S(f,N(f,t))-S(f)+1-N(f,t)+D(f,t))/(S(f,N(f,t))-S(f)+1).$$

This equation for estimating the upstream packet loss ratio (including discards) can be broken down as follows. The number of packets of flow f that have been lost upstream up to time t is:

$$S(f,N(f,t))-S(f)+1-N(f,t)$$

That is, S(f, N(f,t)) is the sequence number of the last received packet of flow f, and S(f) is the sequence number of the first received packet of flow f. Hence, subtracting the first sequence number from the last and adding 1, as defined by formula S(f, N(f,t))−S(f)+1, yields the total number of packets transmitted for flow f. But only N(f,t) packets have arrived at the packet buffer, which indicates that S(f, N(f,t))−S(f)+1−N(f,t) packets have been lost upstream.

To properly assess the condition of flow f before making a discard decision, the number of packets of flow f that have been discarded by the buffer D(f,t) must be taken into account. A simple counter that is incremented every time a packet from flow f is discarded can be used to obtain and keep track of D(f,t).

Hence, the total number of packets lost or discarded is:

$$S(f,N(f,t))-S(f)+1-N(f,t)+D(f,t).$$

Now, the estimated loss ratio, including packets discarded at the packet buffer, is easily understood to be: S(f, N(f,t))−S(f)+1−N(f,t)+D(f,t)) divided by the number of packets transmitted (i.e., S(f, N(f,t))−S(f)+1).

When a new packet arrives at the buffer and the buffer is already full, a decision d must be made about which packet to select for discard. One can discard either the arriving packet or one of the packets already stored in the buffer, (i.e., P(t)).

Let s be a time at which a new packet arrives to the buffer and the buffer is already full. Let g be the label of the flow to which the new packet s arrival time belongs. Let $A_{buf}(s)$ be the set of active flows that have at least one packet waiting in the buffer at time s. Note that $A_{buf}(s)$ is a subset of A(t), which is, as described above, the set of active flows passing through the buffer up to time t. Then the decision d is based on the label g and the computed estimates L*(f,s) for all flows f such that f is an element of the set $A_{buf}(s)$. Thus, we may write:

$$d=F(g,L^*(g,s),L^*(f,s)|f\in A_{buf}(s)),$$

where:

$$L^*(f,s)=(S(f,N(f,s))-S(f)+1-N(f,s)+D(f,s))/(S(f,N(f,s))-S(f)+1),$$

$$L^*(g,s)=(S(g,N(g,s))-S(g)+1-N(g,s)+D(g,s))/(S(g,N(g,s))-S(g)+1),\text{ and}$$

F is the decision policy.

The decision about which packet to select for discard is, therefore, made dependent on the upstream packet loss ratio that includes any previous discards at the buffer. In conventional selective packet discard schemes, the discard decision does not take any upstream loss estimates into account in making selective packet discard decisions.

Figure 6:
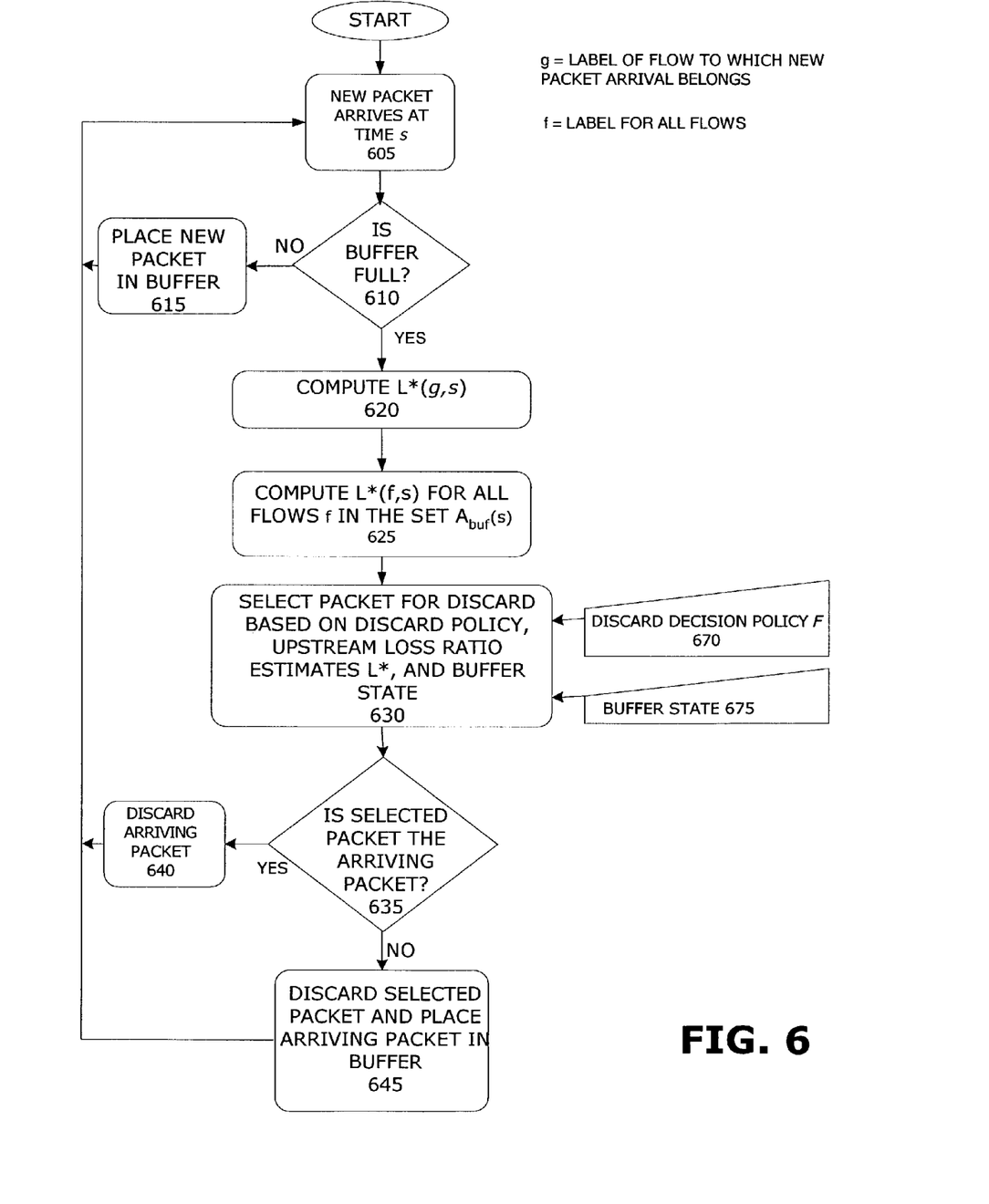
FIG. 6 depicts a flow diagram illustrating the steps performed in a selective discard mechanism configured, in accordance with one embodiment of the present invention, to use sequence numbers to determine whether to discard an arriving data packet or a packet already stored in the packet buffer.

FIG. 6 illustrates, in flow diagram form, what happens when a new packet from flow g arrives at the buffer at time s. As shown in step 605 of FIG. 6, a new packet arrives at time s. If the buffer is not full (as determined by step 610), then the arriving packet is placed in the buffer in step 615 and processing returns to step 605 to await another packet. However, if it is determined at step 610 that the buffer is full, then an estimated upstream packet loss for flow g at time s is calculated in step 620. Next, in step 625, an estimated upstream packet loss is calculated for all traffic flows f at time s. Then a packet is selected for discard at step 630. The discard decision may be based on a specified Discard Decision Policy F (designated 670 in FIG. 6) and/or a buffer state (designated 675). If the packet selected for discard in step 630 is the arriving packet (as determined by step 635), then the arriving packet is discarded from the buffer (step 640) and control passes again to step 605, where the process begins all over again. If, on the other hand, the packet selected for discard is not the arriving packet, then, as shown in step 645, the selected packet is discarded from the buffer to make room for the arriving packet.

In the above-described method of selective packet discard, the choice of a specific selective packet discard policy is left open as an implementation decision. Various selective packet discard policies may be adopted depending on the particular end-to-end QoS objectives or QoS fairness criteria that one may be trying to realize. For example, one may be interested in minimizing the maximum loss rate over the packet flows that traverse a buffer. In this case, a selective discard policy that one may choose to adopt is to simply discard a packet from the active flow (that has at least one packet waiting in the buffer) with the smallest estimated upstream packet loss ratio. In a preferred embodiment, the upstream packet loss ratio estimates are computed prior to making the decision about which packet to discard. The state of the buffer may also be included in the decision-making process, as shown in FIG. 6.

Since the present invention, as applied to any particular buffer in a packet exchange network, operates independently of its application and independently of any other buffers at any other packet switches in the packet exchange network, it may be implemented in a distributed manner by placing algorithms at each buffer.

As stated above, the operator of a packet exchange network may seek to minimize the maximum loss rate over the packet flows that traverse the buffer. The operator may also want to minimize the maximum of a weighted loss rate function over the packet flows that traverse the buffer. A detailed description of an example of a "weighted loss rate function" is now provided.

A discard policy employing an un-weighted loss rate function tends to minimize the maximum losses associated with all the data flows as a whole. Spreading discards evenly over the data flows can accomplish this goal. In a weighted loss rate function, the loss rates of the data flows are multiplied by a set of constant coefficients, e.g. $C_1*L_1, C_2*L_2, C_3*L_3$, and so on, where $C_1$ is the constant coefficient associated with flow 1 and $L_1$ is the loss rate for flow 1, etc. The effect is to amplify the importance of the loss rate if C>1 or attenuate the importance of the loss rate if C<1. The discard policy will then tend to minimize the maximum of $(C_1*L_1, C_2*L_2, C_3*L_3, \dots )$, as opposed to minimizing the maximum of $(L_1, L_2, L_3, \dots )$. The goal of the weighting is, therefore, to 'force' more discards onto flows with lower coefficient values and less discards onto flows with higher coefficient values. Notably, if C=1 for all the coefficients, then the weighted function reduces to an un-weighted loss rate function.

Figure 7:
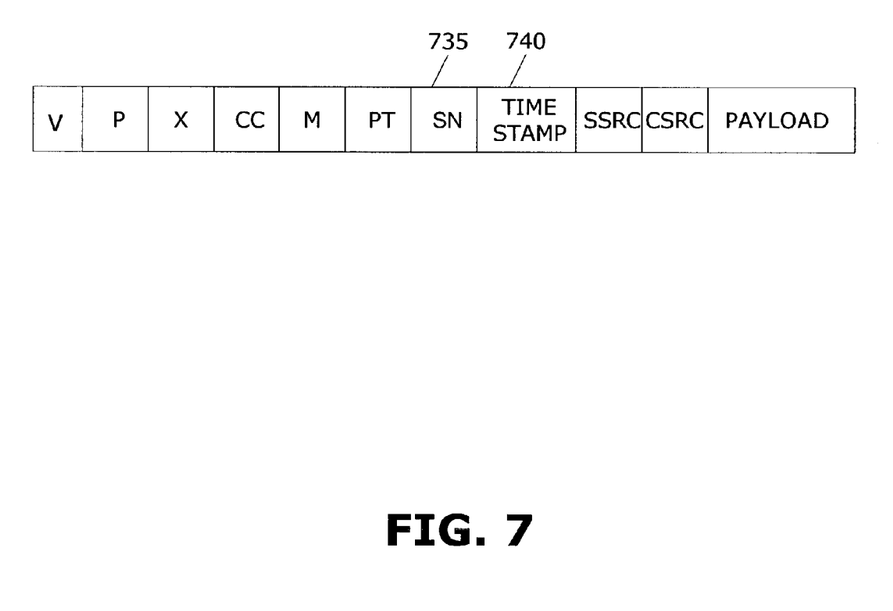
FIG. 7 shows the format of one embodiment of a real-time transport protocol (RTP) data packet that might be used in a packet switching network configured to operate according to the present invention.

The present invention uses ordering information embedded in each data packet, such as forward sequence numbers or time-stamps, to make selective discard decisions. FIG. 7 illustrates an example of a data packet—in this case a RTP packet—which contains a forward sequence number that could be used by the present invention to calculate an estimated upstream loss ratio. RTP provides end-to-end network transport functions suitable for applications transmitting real-time data, such as audio, video or simulation data, over multicast or unicast network services.

The format of an RTP packet is defined by the Internet Engineering Task Force (IETF) RFC 1889 (January 1996), the entirety of which is incorporated herein by reference. As can be seen in FIG. 7, the RTP packet contains a sequence number field, designated with reference numeral 735, in FIG. 7, which represents the data packet's sequence in any data flow containing the packet. The sequence number is incremented by some constant quantity for each RTP data packet sent, and may be used by the receiving node to detect packet loss and restore packet sequence. Notably, the initial value of the sequence number may be random (unpredictable), depending on the implementation, to make attempts to defeat security measures employed by the data stream, such as encryption, more difficult.

RTP packets also include a timestamp, which is designated with reference numeral 740 in FIG. 7. The timestamp reflects the sampling instant of the first octet in the RTP data packet. The initial value of the timestamp in an RTP packet also may be random, as for the sequence number.

When forward sequence numbers are not available, it may still possible to determine which packets have been lost upstream using other information that may be available. For example, if packet headers contain timestamps which indicate the relative emission times of packets at the source, and if the packets are known to be emitted periodically with a given fixed period, then one may determine which packets have been lost upstream by examining the timestamps. For example, if it is known that packets are emitted periodically with a period of 5 milliseconds and the sequence of timestamps (in milliseconds) of received packets is 10, 15, 20, 25, 35, 40, 55, 60, and so on, then we can determine that there is one lost packet after the fourth received packet (i.e., the packet with timestamp 30 is missing) and two lost packets after the sixth received packet (i.e., the packets with timestamps 45 and 50 are missing).

RTP packets are just one example of the kind of data packets having a format suitable for application of the present invention. The invention also may be beneficially applied in packet exchange networks for data packets having various other formats. For example, a transport control protocol (TCP) data packet contains a header that includes a 32-bit sequence number representing the number of bytes transmitted, including the first byte in the present packet. Thus, the present invention could be adapted to use the TCP header sequence numbers to achieve the same benefits discussed herein with respect to RTP packets. Instead of calculating and using an estimate for the number of packets lost or discarded upstream, however, a mechanism that makes discard decisions using TCP sequence numbers would, in accordance with the present invention, calculate and use estimates of the number of bytes lost or discarded upstream.

The above-described preferred embodiments are intended to illustrate the principles of the invention, but not to limit its scope. Various other embodiments may occur to those skilled in the art upon reading the present disclosure or practicing the claimed invention. Such variations, modifications and equivalents are intended to come within the scope of the invention and the appended claims.

What is claimed is:

1. A packet switch, comprising:
an inbound transmission channel;
a packet buffer configured to receive an arriving data packet for a data flow from the inbound transmission channel; and
a processor configured to
determine an embedded ordering information number of a first received packet in the data flow;
determine an embedded ordering information number of a second received packet in the data flow;
calculate an estimated number of packets previously transmitted for the data flow, based on the first and second embedded ordering information numbers;
determine a number of packets received for the data flow;
calculate an estimated upstream packet loss for the data flow by dividing the number of data packets in the data flow that have been lost or discarded by the number of data packets in the data flow; and
make a determination, based on the estimated upstream packet loss for the data flow remote from the packet switch, whether to discard the arriving data packet or a data packet previously stored in the packet buffer.

2. The packet switch of claim 1, wherein the embedded ordering information is determined based on a sequence number associated with the arriving data packet.

3. The packet switch of claim 1, wherein the embedded ordering information is determined based on a time-stamp associated with the arriving data packet.

4. The packet switch of claim 1, wherein the processor is further configured to remove the arriving data packet from the inbound transmission channel.

5. The packet switch of claim 1, wherein the processor is further configured to delete the data packet previously stored from the packet buffer.

6. The packet switch of claim 5, wherein the processor is further configured to discard the data packet previously stored in the packet buffer and insert the arriving data packet.

7. The packet switch of claim 1, wherein the determination made by the processor is further based on a buffer state.

8. The packet switch of claim 1, wherein the buffer state comprises a value indicating an arrival time for the data packet previously stored in the packet buffer.

9. The packet switch of claim 1, wherein the buffer state comprises a value indicating an ordering for the data packet previously stored in the packet buffer.

10. The packet switch of claim 1, wherein the determination made by the processor is further based on a specified discard policy.

11. The packet switch of claim 10, wherein the specified discard policy minimizes the maximum loss rate of a plurality of data flows traversing the packet buffer.

12. The packet switch of claim 10, wherein the specified discard policy minimizes the maximum of a weighted loss rate function applied to a plurality of data flows traversing the packet buffer.

13. The packet switch of claim 7, wherein the determination made by the processor is further based on a specified discard policy.

14. A distributed data traffic management system for a packet exchange network, comprising:
   a plurality of data communication channels; and
   a plurality of packet switches connected to the packet exchange network, each packet switch operable to transmit a plurality of data packets over a subset of the plurality of data communications channels;
   wherein at least one packet switch in the plurality of packet switches comprises, an inbound transmission channel;
   a packet buffer configured to receive an arriving data packet for a data flow from the inbound transmission channel; and
   a processor configured to
      determine an embedded ordering information number of a first received packet in the data flow;
      determine an embedded ordering information of a last received packet in the data flow;
      calculate an estimated number of packets previously transmitted for the data flow, based on the first and last embedded ordering information numbers;
      determine a total number of packets received for the data flow;
      calculate an estimated upstream packet loss for the data flow by dividing the total number of data packets in the data flow that have been lost or discarded by the total number of data packets in the data flow; and
      make a determination, based on the estimated upstream packet loss for the data flow remote from the respective at least one packet switch, whether to discard the arriving data packet or a data packet previously stored in the packet buffer.

15. The distributed data traffic management system of claim 14, wherein the embedded ordering information is determined based on a sequence number associated with the arriving data packet.

16. The distributed data traffic management system of claim 14, wherein the embedded ordering information is determined based on a time-stamp associated with the arriving data packet.

17. The distributed data traffic management system of claim 14, wherein the processor is further configured to remove the arriving data packet from the inbound transmission channel.

18. The distributed data traffic management system of claim 14, wherein the processor is further configured to delete the data packet previously stored in from the packet buffer.

19. The distributed data traffic management system of claim 14, wherein the processor is further configured to discard the data packet previously stored in the packet buffer and insert the arriving data packet.

20. The distributed data traffic management system of claim 14, wherein the determination made by the processor is further based on a buffer state.

21. The distributed data traffic management system of claim 14, wherein the buffer state comprises a value indicating an arrival time for the data packet previously stored in the packet buffer.

22. The distributed data traffic management system of claim 14, wherein the buffer state comprises a value indicating an ordering for the data packet previously stored in the packet buffer.

23. The distributed data traffic management system-of claim 14, wherein the determination made by the processor is further based on a specified discard policy.

24. The distributed data traffic management system of claim 23, wherein the specified discard policy minimizes the maximum loss rate of a plurality of data flows traversing the packet buffer.

25. The distributed data traffic management system of claim 23, wherein the specified discard policy minimizes the maximum of a weighted loss rate function applied to a plurality of data flows traversing the packet buffer.

26. The distributed data traffic management system of claim 20, wherein the determination made by the processor is further based on a specified discard policy.

27. A method for selectively discarding data packets in a packet exchange network having a packet switch comprising an inbound transmission channel and a packet buffer, the method comprising the steps of:
   receiving at the inbound transmission channel an arriving data packet for a data flow --g--;
   if the packet buffer is not full, transferring the arriving data packet from the inbound transmission channel to the packet buffer; and
   if the packet buffer is full,
      determining an embedded ordering information number of a first received data packet in the data flow g;
      determining an embedded ordering information number of a last received data packet in the data flow g at time t;
      calculating an estimated number of data packets previously transmitted at time t for the data flow g, based on the first and last embedded ordering information numbers;
      determining a total number of data packets received for the data flow g;
      determining the number of data packets $D(g,t)$ in the data flow that were previously discarded from the inbound transmission channel,
      calculating an estimated upstream loss $L^*(g,t)$ for the data flow remote from the packet switch by dividing the total number of data packets in the data flow g that have been lost or discarded by the total number of data packets in the data flow g,
      calculating an estimated upstream loss $L^*(f,t)$ for all data flows in the packet exchange network remote from the packet switch and having at least one data packet stored in the packet buffer, and
      discarding the arriving data packet or a data packet previously stored in the packet buffer, based on the number of previously-discarded data packets $D(g,t)$ for the data flow, the estimated upstream loss $L^*(g,t)$ for the data flow, and the estimated upstream loss $L^*(f,t)$ for all of the data flows in the packet exchange network having at least one data packet stored in the packet buffer.

28. The method of claim 27, wherein the embedded ordering information for the data flow g is based on a sequence number associated with the arriving data packet.

29. The method of claim 27, wherein the embedded ordering information for the data flow g is based on time-stamp associated with the arriving data packet.

30. The method of claim 27, further comprising the step of determining the estimated upstream packet loss $L^*(f,t)$ for all of the data flows in the packet exchange network having at least one data packet stored in the packet buffer based on a sequence number associated with the at least one data packet.

31. The method of claim 27, further comprising the step of determining the estimated upstream packet loss $L^*(f,t)$ for all of the data flows in the packet exchange network having at least one data packet stored in the packet buffer based on a time-stamp associated with the at least one data packet.

32. The method of claim 27, further comprising the step of discarding the data packet previously stored in the packet buffer and inserting the arriving data packet.

33. The method of claim 27, wherein the step of discarding the arriving data packet or the data packet previously stored in the packet buffer is further based on a buffer state.

34. The method of claim 33, wherein the buffer state comprises a value indicating an arrival time for the data packet previously stored in the packet buffer.

35. The method of claim 33, wherein the buffer state comprises a value indicating an ordering for the data packet previously stored in the packet buffer.

36. The method of claim 27, wherein the step of discarding the arriving data packet or the data packet previously stored in the packet buffer is further based on a specified discard policy.

37. The method of claim 36, wherein the specified discard policy minimizes the maximum loss rate of a plurality of data flows traversing the packet buffer.

38. The method of claim 36, wherein the specified discard policy minimizes the maximum of a weighted loss rate function applied to a plurality of data flows traversing the packet buffer.

39. The method of claim 33, wherein the step of discarding the arriving data packet or the data packet previously stored in the packet buffer is further based on a specified discard policy.

40. A device for selectively discarding data packets in a packet exchange network, comprising:
   an inbound transmission channel;
   a packet buffer configured to receive from the inbound transmission channel an arriving data packet for a data flow; and
   a processor configured
      to transfer the arriving data packet from the inbound transmission channel to the packet buffer if the packet buffer is not full, and
      if the packet buffer is full,
         to determine an embedded ordering information number of a first received data packet in the data flow;
         to determine an embedded ordering information number of a last received data packet in the data flow;
         to calculate an estimated number of data packets previously transmitted at time t for the data flow g, based on the first and last embedded ordering information numbers;
         to determine the number of data packets $D(g,t)$ in the data flow that were previously discarded from the inbound transmission channel,
         to calculate an estimated upstream loss $L^*(g,t)$ for the data flow remote from the device by dividing the total number of data packets in the data flow that have been lost or discarded by the total number of data packets in the data flow,
         to calculate an estimated upstream loss $L^*(f,t)$ for all data flows in the packet exchange network remote from the packet switch and having at least one data packet stored in the packet buffer, and
         to discard the arriving data packet or a data packet previously stored in the packet buffer, based on the number of previously-discarded data packets $D(g,t)$ for the data flow, the estimated upstream loss $L^*(g,t)$ for the data flow, and the estimated upstream loss $L^*(f,t)$ for all of the data flows in the packet exchange network having at least one data packet stored in the packet buffer.

41. The device of claim 40, wherein the embedded ordering information number for the data flow is based on a sequence number associated with the arriving data packet.

42. The device of claim 40, wherein the embedded ordering information number for the data flow is based on a time-stamp associated with the arriving data packet.

43. The device of claim 40, wherein the processor is further configured to determine the estimated upstream packet loss $L^*(f,t)$ for all of the data flows in the packet exchange network having at least one data packet stored in the packet buffer based on a sequence number associated with the at least one data packet.

44. The device of claim 40, wherein the processor is further configured to determine the estimated upstream packet loss $L^*(f,t)$ for all of the data flows in the packet exchange network having at least one data packet stored in the packet buffer based on a time-stamp associated with the at least one data packet.

45. The device of claim 40, wherein the processor is further configured to discard the data packet previously stored in the packet buffer and insert the arriving data packet.

46. The device of claim 40, wherein the processor is further configured to discard the arriving data packet or the data packet previously stored in the packet buffer based on a buffer state.

47. The device of claim 46, wherein the buffer state comprises a value indicating an arrival time for the data packet previously stored in the packet buffer.

48. The device of claim 46, wherein the buffer state comprises a value indicating an ordering for the data packet previously stored packet buffer.

49. The device of claim 40, wherein the processor is further configured to discard the arriving data packet or the data packet previously stored in the packet buffer based on based on a specified discard policy.

50. The device of claim 49, wherein the specified discard policy minimizes the maximum loss rate of a plurality of data flows traversing the packet buffer.

51. The device of claim 49, wherein the specified discard policy minimizes the maximum of a weighted loss rate function applied to a plurality of data flows traversing the packet buffer.

52. The device of claim 49, wherein the processor is further configured to discard the arriving data packet or the data packet previously stored in the packet buffer based on a specified discard policy.

53. The packet switch of claim 49, wherein the sequence number represents a number of bytes transmitted.

54. The distributed data traffic management system of claim 15, wherein the sequence number represents a number of bytes transmitted.

55. The method of claim 28, wherein the sequence number represents a number of bytes transmitted.

56. The device of claim 41, wherein the sequence number represents a number of bytes transmitted.

57. The packet switch of claim 1, wherein the second received packet is a last received packet and the number of packets received is a total number of packets received.

58. The packet switch of claim 1, wherein a subset of the received packets for the data flow are maintained in the packet buffer.

* * * * *